US 6,594,722 B1

(12) United States Patent
Willke, II et al.

(10) Patent No.: US 6,594,722 B1
(45) Date of Patent: Jul. 15, 2003

(54) MECHANISM FOR MANAGING MULTIPLE OUT-OF-ORDER PACKET STREAMS IN A PCI HOST BRIDGE

(75) Inventors: Theodore L. Willke, II, Tacoma, WA (US); Eric J. DeHaemer, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 455 days.

(21) Appl. No.: 09/606,306

(22) Filed: Jun. 29, 2000

(51) Int. Cl.[7] .............................................. G06F 13/00
(52) U.S. Cl. ....................... 710/313; 710/310
(58) Field of Search .................. 710/52, 107, 306, 710/309, 308, 310, 313, 315

(56) References Cited

U.S. PATENT DOCUMENTS 6,240,479 B1 * 5/2001 Snyder et al. .............. 710/113
6,317,803 B1 * 11/2001 Rasmussen et al. ........ 710/107
6,425,024 B1 * 7/2002 Kelley et al. ................ 710/56

* cited by examiner

Primary Examiner—Glenn A. Auve
(74) Attorney, Agent, or Firm—Blakely, Sokoloff, Taylor & Zafman LLP (57) ABSTRACT

A circuit is provided that includes a bridge circuit for connecting a first bus to a second bus. The bridge circuit also includes a first bus interface coupled to the first bus and is adapted to receive a plurality of transactions from the first bus. Each transaction has an address targeting the second bus and data the length of which defines a transaction size. A request data engine for issuing requests on a second bus is also provided. The request data engine is capable of assigning a unique encoded header to data streams. Control logic is provided that is adapted to store a first portion of a first transaction of the plurality of transactions in a memory coupled between the first bus and the second bus. Management logic is provided that is adapted to manage multiple out-of-order data streams wherein the data streams may remain outstanding to the bridge circuit. Additionally, a method is provided that includes capturing a data stream request header. Determining which data stream a request is mapped into. Assigning a unique encoded header to a data packet. Issuing request packets with the unique encoded header. Receiving completion request data packets. Setting a first pointer in a memory. Incrementing a portion of a memory address. Checking if all data packets are stored in the memory. And, managing multiple out-of-order data streams wherein the data streams may remain outstanding to a bridge circuit.

26 Claims, 7 Drawing Sheets

MECHANISM FOR MANAGING MULTIPLE OUT-OF-ORDER PACKET STREAMS IN A PCI HOST BRIDGE

BACKGROUND OF THE INVENTION

1. Field of the Invention

The present invention relates to a method and apparatus for managing multiple out-of-order packetized data streams in a network or computer system.

2. Background Information

One of the standard bus architectures found in personal computers and workstations is the Peripheral Component Interconnect (PCI) bus. A PCI bus is comprised of a set of wires that electronically interconnect various semiconductor chips and input/output devices of a computer system. Electronic signals are transmitted over the bus so that various components can communicate with each other. A PCI host bridge is a device that buffers data and translates transaction format between an industry standard PCI bus and a proprietary expander bus in most modern workstations and server platforms. The system bus and PCI bus are not physically connected, however, the PCI bridge establishes a "bridge" between the two buses to allow data transfers between them.

PCI delayed read requests can be represented internally to a chipset as split transactions composed of a request packet containing header information and a completion packet containing identification information and, in general, a portion of the requested read data. For a host bridge that made a request to match the returning completion packet with the proper request packet, lengthy decoding either by full source or destination address field decoding or other methods are typically required. The matching of request and completion packets adds to transaction process latency. Once the completion is matched to the request, the bridge will then buffer the data until the requesting PCI master queries the PCI host bridge. That is, the PCI master is required to poll the target of the delayed request until at least one data transfer is consumed. Therefore, the PCI master must receive one unit of data transfer from the completion packet stream before it is allowed to retire its request. This is known as read retrying. When the requesting PCI master returns, the bridge begins transferring the data belonging to the requesting master, sometimes stitching multiple expander bus packets together to provide continuous data streaming onto the PCI bus. Both the PCI host bridge and PCI master are capable of using linear address bursting as described in PCI Local Bus Specification, Revision 2.1 and 2.2, by the PCI Special Interest Group, Portland, Oreg.

Data requested by a particular PCI master, starting at a particular address, and requested in an ordered contiguous address range (starting at the lowest address and incrementing) will be referred to as a data stream. Since most PCI buses support multiple PCI masters, a high performance host bridge will need to generally have the capability to handle more than one data stream at any given point in time. Additionally, to provide high throughput read data delivery, the host bridge will generally be required to hide a large portion of the chipset latency by maintaining multiple request packets outstanding to the expander bus interface at any given instant.

Due to the nature of the chipset I/O and memory subsystem designs, the read completion packets associated with a particular data stream may be returned to the host bridge out of sequential order. Current PCI host bridge designs do not provide the capability for efficiently managing multiple out-of-order packetized data streams where multiple packets (per stream or for a set of streams) may be outstanding to chipset components. The host bridge is responsible for reassembling each PCI data stream as packets are returned by the expander bus interface. Reassembly includes properly ordering the packets into one "stitched" sequential data stream and identifying which returning packets belong to what PCI data streams. An additional problem is that a PCI master may stop reading a particular read stream and begin a new one at any point after consuming the first data transfer of an existing stream. Therefore, a high performance host bridge must be capable of changing the stream context and issuing new stream packets prior to the previously sent packets returning from the expander bus interface. Buffer space is limited, therefore, the host bridge will generally reuse the previously allocated stream buffer.

DETAILED DESCRIPTION OF THE INVENTION

The invention generally relates to an efficient method and apparatus for managing multiple data streams composed of packetized and possible out-of-order data streams. One embodiment applies a unique encoding scheme to a header and provides an infrastructure to use the encoding in data stream management. While the description below relates to a PCI based system, the invention is applicable to any computer network or computer system in which multiple data threads are managed simultaneously and transported using packets. Referring to the figures, exemplary embodiments of the invention will now be described. The exemplary embodiments are provided to illustrate the invention and should not be construed as limiting the scope of the invention.

Figure 1:
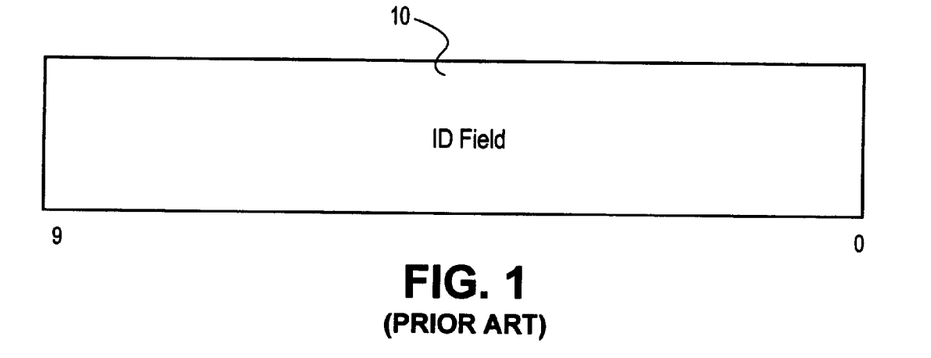
FIG. 1 illustrates a basic Transaction ID (TID) field of a header.

FIG. 1 shows an embodiment of basic ID field 10 of a PCI header. ID field 10 has a 10-bit binary field. According to protocol, the host bridge is permitted to assign ID fields to data packets using any appropriate algorithm. Therefore, the ID field serves for the benefit of the host bridge.

Figure 2:
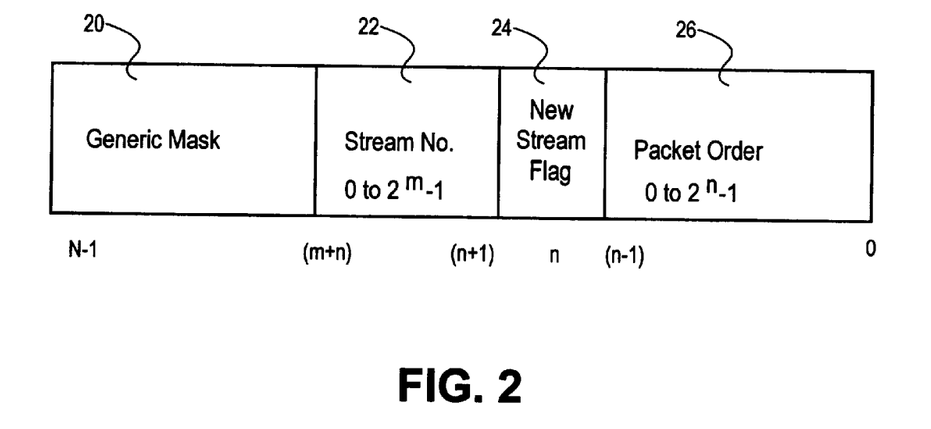
FIG. 2 illustrates a TID field as configured by an embodiment of the invention.

FIG. 2 shows an embodiment of the invention having four sub-fields assigned within a TID (Transaction ID) 10-bit field. It should be noted, however, that the invention may also use any field of a header other than a TID field or any useable bits in an existing ID field. In this embodiment, the TID field is contained within both the request header of an expander request packet and the completion header of a completion packet. The four sub-fields are comprised of m-bit stream number code 22, n-bit packet order code 26, one-bit new stream flag 24, and 10-(m+n+1) bit mask 20. While the stream number code 22 and the packet order code 26 are presented as binary-encoded values, it should be noted that other schemes may be used as well. Mask 20 may be used to provide a method of fast decoding of the transaction type, such as memory read, memory read multiple, configuration read, etc., or for any other suitable purpose. Stream number code 22 is used to identify the stream context of a packet, wherein one unique context is assigned to each unique PCI delayed request. New stream flag 24 is set for the first expander packet in a new stream context and is otherwise deasserted. Packet order code 26 is sequentially incremented and applied to each in-order read request packet as the packet is sent to the expander bus interface. Each of the m stream contexts keeps track of its own current packet order code. The packet order code wraps around when required, for example, when incrementing from the highest value back to the initial value.

The invention's TID encoding allows a host bridge to make use of all necessary information for PCI reconstruction explicitly in the transaction packets themselves. An advantage of this is that costly timing and logic procedures during packet reception are avoided.

Figure 3:
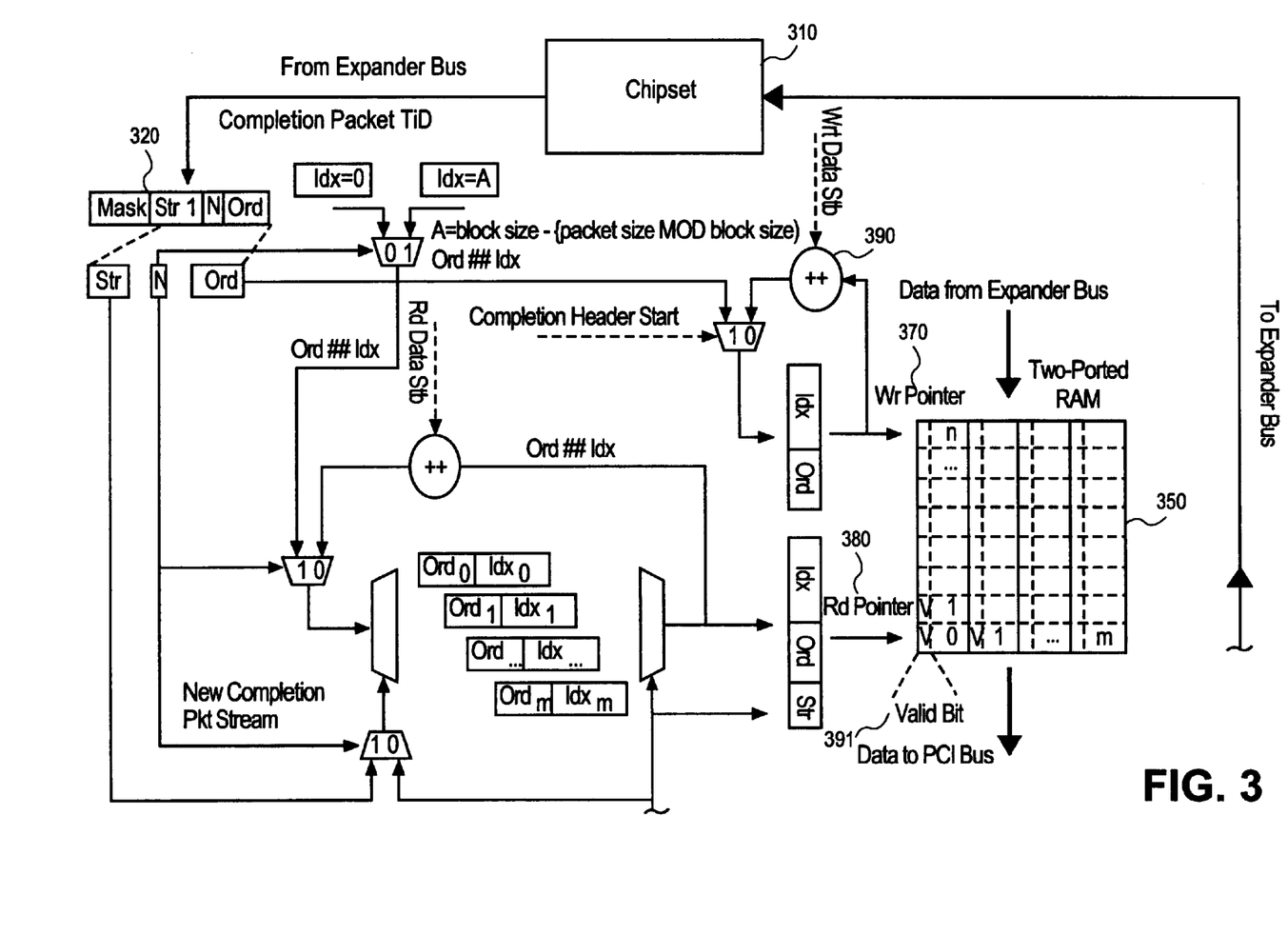
FIG. 3 illustrates an embodiment of the invention using a header with the invention's encoded four sub-fields.
Figure 4:
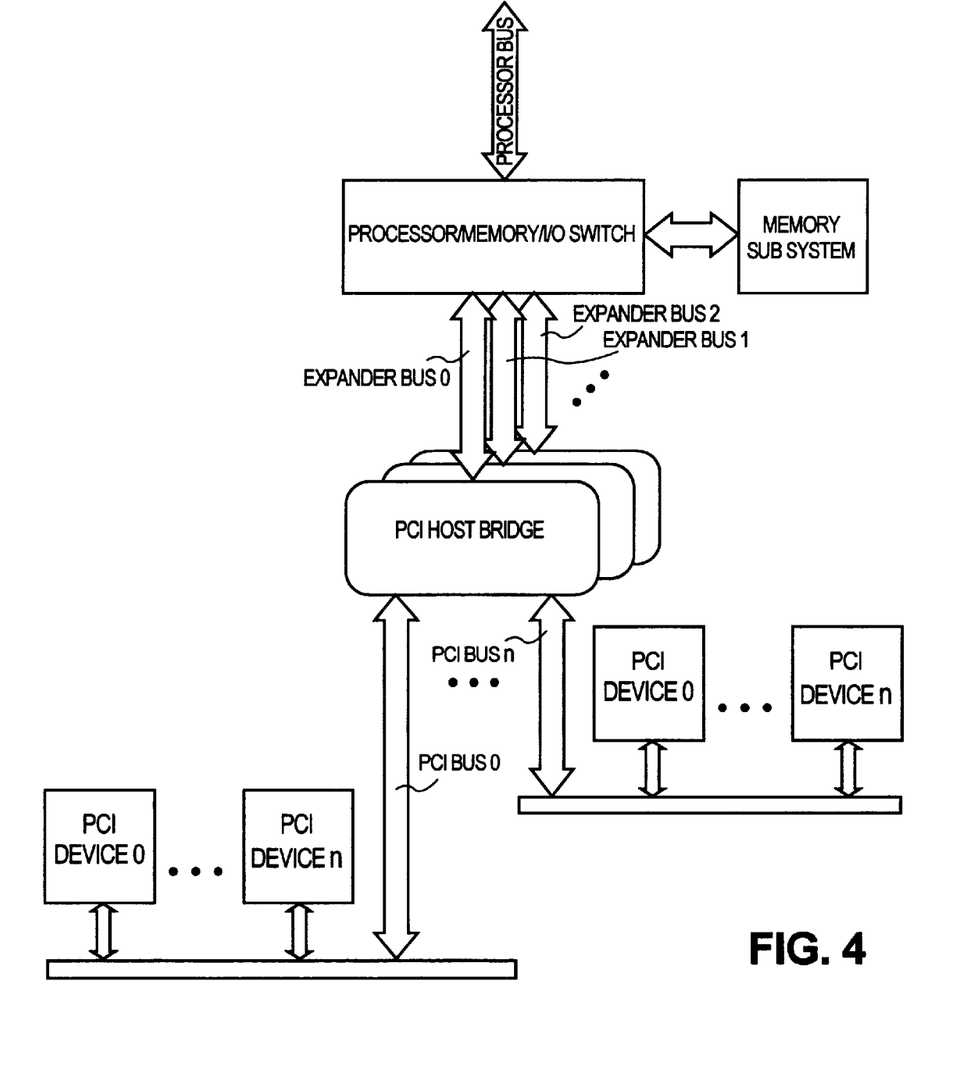
FIG. 4 illustrates a block diagram of a PCI host bridge in a computer system.
Figure 5:
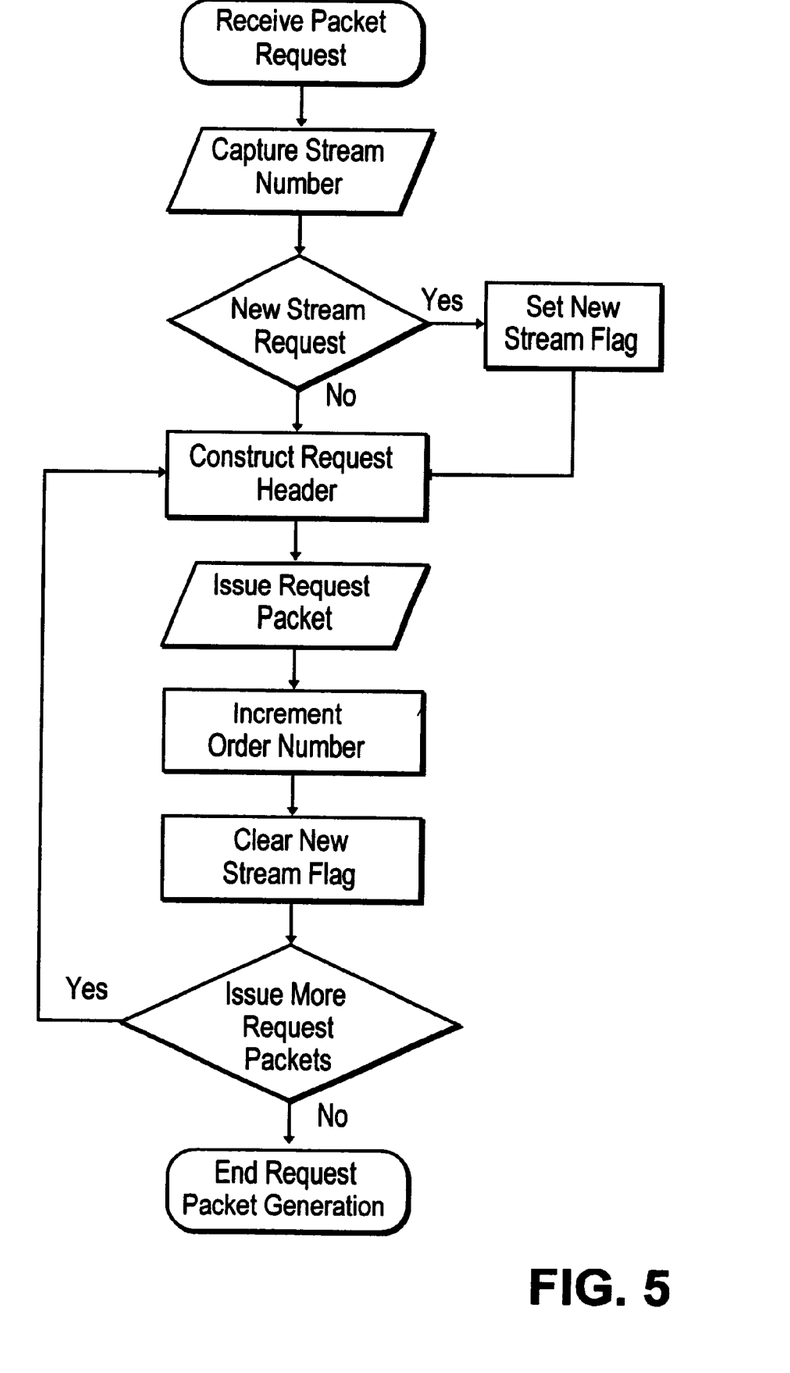
FIG. 5 illustrates a flow diagram of a data request packet engine in an embodiment of the invention.
Figure 6:
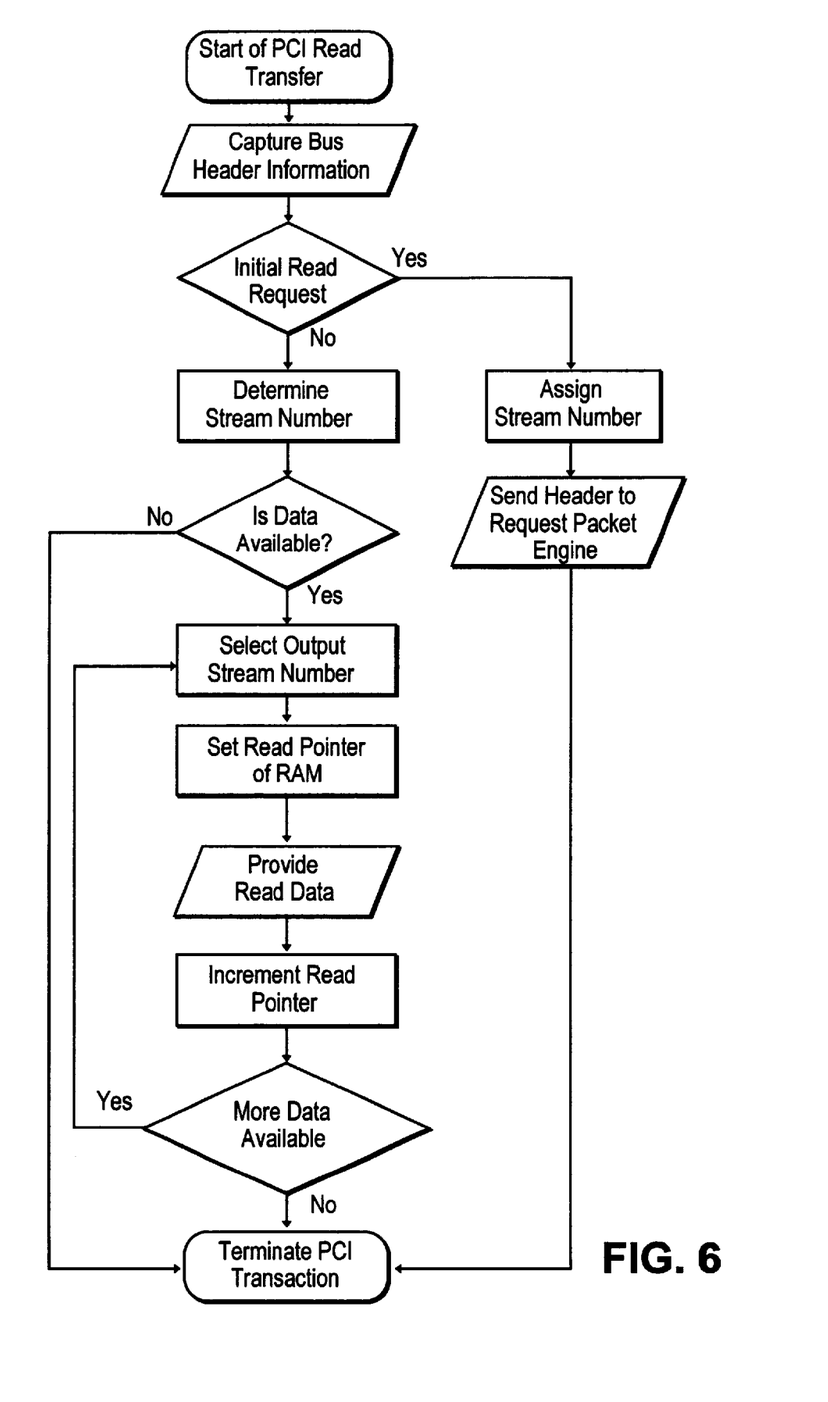
FIG. 6 illustrates a flow diagram of a data read in an embodiment of the invention.
Figure 7:
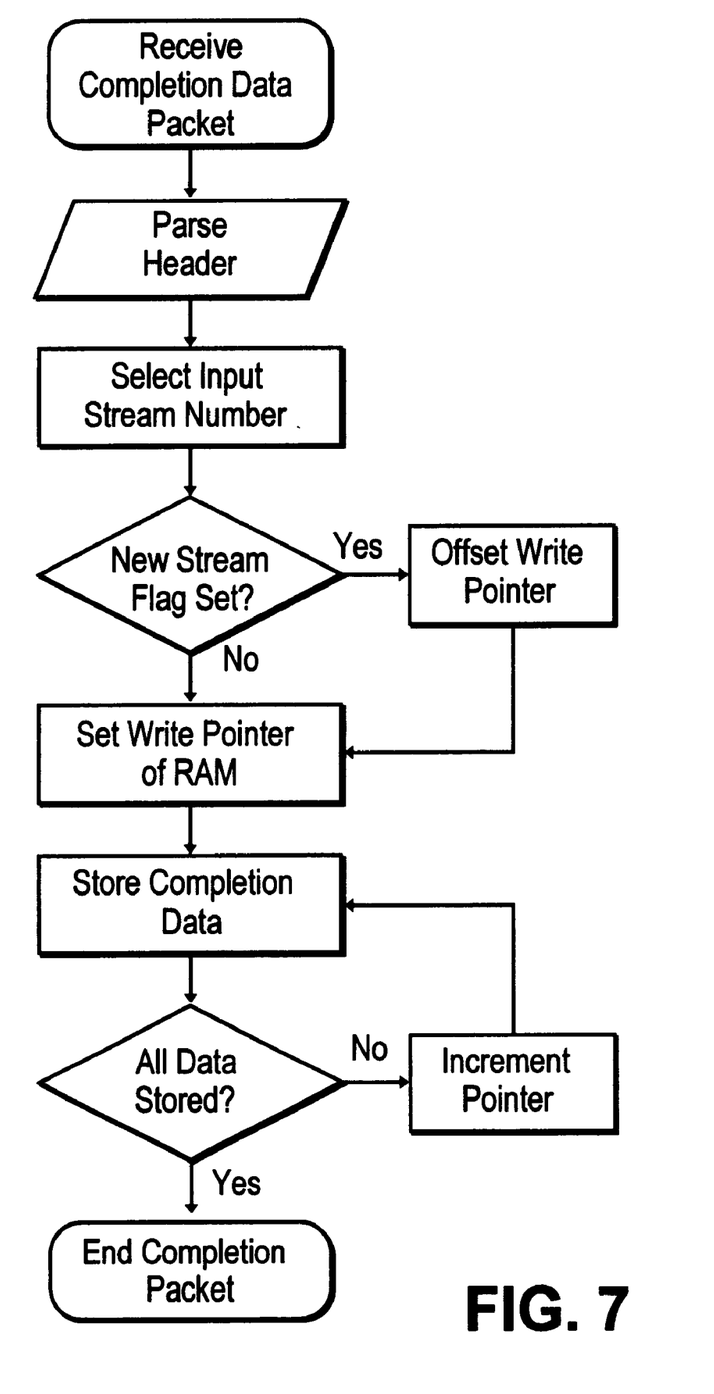
FIG. 7 illustrates a flow diagram of a completion packet receipt in an embodiment of the invention.

FIG. 3 shows an embodiment of the invention using the encoded TID field. Note that FIG. 3 indicates the embodiments relevant TID fields and does not show the PCI or expander bus additional header fields, and that chipset 310, packet resource tracking 311, and packet prefetch engine 312 are not included in an embodiment of the invention and are illustrated for completeness. Referring to FIG. 3, a PCI master initiates a read transaction on the PCI bus by submitting all necessary header information during a read retry sequence to PCI target logic 360. The PCI request header is captured and assigned to an available stream slot in stream look up table 330. Look up table 330 is used to determine what stream the PCI master's request is mapped to during subsequent inquiries by the PCI master. At the same time, the header is translated into a new format for issue as a read packet request on the expander bus interface which, takes place at the request packet engine 340. That is, the PCI request header information is translated into an expander bus header. The PCI request header contains fields for address, byte enable and command information. Therefore, after the PCI header is translated into an expander bus header at request packet engine 340, the expander bus header will contain fields for address, byte enable, command information, request length, and packet identification number (i.e., the TID field). The PCI specification specifies that a master is able to burst read for as many data phases as desired, that is, the total burst length is not known a priori. The host bridge will initialize the first packet in a data stream which, will generally be sized according to the following: [(cache-line size)−(PCI request address) MOD (cache-line size)]. Note that the packets are sized in data words (DWords). Following the initial request, the packets are set to the full size of the cache-line. Note that for simplification, this description will assume that the associated packets requested over the expander bus will be of fixed size, i.e. a 64-byte packet size. It should also be noted that the cache-line size selected is dependent on the architecture used.

Request packet engine 340 assigns a header, a header having a TID field for example, to the first packet with the correct stream number 22 value (e.g., stream m), new stream flag 24 is set, and the packet order 26 value that is to be used next. Subsequent packets in the same stream context possess a deasserted new stream flag 24. With each request packet transmission for a particular stream, the packet order code 26 is incremented by one (and wraps around from $2^{n}-1$ back to 0). For example, if the packet order 26 values are initially zero for all streams 0 to m, and stream m issues one 64-byte packet, streams 0 to (m−1) retain zero packet order 26 values for their next packet issue. Stream m then issues its next packet with the packet order 26 sub-field set to 1. Each packet order increment represents the minimum memory allocation that the buffer reserves for a block of data (e.g., one cache-line of 64-bytes). Therefore, for a packet size S, where 64 B<S≦128 B, the packet order 26 sub-field would increment by two. If the packet order 26 sub-field size is 3 bits, for example, a maximum of 512 B of buffering may be allocated to a particular stream, in quantities of 64 bytes.

Chipset 310, which does not form part of the invention, may include components such as a memory/I/O/processor switch, routes to parallel-segment PCI buses, intermediate caches, and a memory module (individual elements for chipset 310 are not shown). After a series of request packets are issued, chipset 310 components return stream completion packets with varying latency and order. One stream's completion packets may interleave with another's, and each respective stream's original packet issue order may or may not be maintained.

When a completion packet arrives over the expander bus interface, the PCI host bridge examines the header and parses the TID (or other ID) fields for stream number 22, new stream flag 24, and packet order 26. A memory 350 coupled to write pointer 370 is set to an address value as follows: [stream number##packet order##index], where ##denotes binary concatenation. In one embodiment, memory 350 is a two-ported RAM. Note that memory 350 can be another memory device, such as a cache or buffer. The index value is a DWord pointer into a particular block of memory and is set to zero unless new stream flag 24 is set. If new stream flag 24 is set, the index is initially offset into the block as follows: [block size−(packet size MOD block size)], so that the final DWord written for each and every packet aligns with a block boundary. This data alignment simplifies PCI streaming by providing contiguous valid data ranges a priori. As each DWord streams into the PCI host bridge, the write data strobe 390 increments the [packet order##index] portion of the memory address. This process continues until the packet is completely stored into memory 350. One valid bit flag 391 is stored per memory block and is used by the read delivery mechanism as follows.

At the start, time 0, read pointers 380 and write pointers 370 coupled to memory 350 are set equal. Read pointer 380 is updated in one of two cases: when a TID field is received with new stream flag 24 set, or when a PCI read data transfer takes place. One read pointer 380 is stored per stream. The read pointer 380 consists of [packet order##index]. Even though the memory 350 read pointers 380 and write pointers 370 have the same form, the read pointers 380 and write pointers 370 take on unrelated numerical values. When a TID field is received with the new stream flag 24 set, the read pointer 380 for the stream, numerically known as stream number, is set to [packet order##index], where the initial index is computed as follows: [block size−(packet size MOD block size)].

When a PCI master queries the PCI host bridge for read stream data, the PCI host bridge will either reject the request due to lack of resources, match the request to a particular stream number, or initiate a new stream via request packet engine 340. If the request matches a stream in existence and the memory block containing the read pointer 380 is set as valid, the PCI host bridge begins transferring data to the PCI master while incrementing the read pointer 380 until the master either disconnects or an invalid block boundary is reached. By aligning the data via direct decode during the initial memory write from the expander bus port interface, the read delivery mechanism is not required to skip over invalid regions of memory space during data streaming and may continue read bursts across contiguous block boundaries until an invalid block is encountered. An invalid block may be reached due to the PCI master outpacing the expander bus interface and reaching the end of the data stream, due to a packet returning late and out of order, or due to some other discontinuation of the stream.

Additionally, by examining valid bit 391 on a per block basis and by not repositioning the read pointer unless an asserted new stream flag 24 is received, the read mechanism is guaranteed to deliver valid and in-order packet data to the PCI master. Valid bit 391 is deasserted when either the last DWord of the block is consumed during a read, or when the request packet engine 340 replaces the blocks associated stream context with a new one. All blocks associated with a particular read stream are marked as invalid whenever a stream context switch is performed (not described herein).

The foregoing provides for the case where all PCI stream slots are allocated, but at least one stream is a candidate for replacement because its data was partially read by a PCI master. A partially-read PCI buffer is not required to be immediately invalidated due to an algorithm known as read restreaming (not described herein).

In a conventional scheme, the host bridge would tag one of the existing streams for replacement, wait for the tagged stream's outstanding packets to return from chipset 310, and then issue the replacing stream's first request packet. If the read delivery logic is designed to wait for both the new stream flag 24 and the associated data block valid bit 391 to be set prior to delivering a new stream context data to a retrying PCI master, the request packet engine 340 may initiate the replacement stream's PCI request packets prior to all of the replaced stream's packets returning. This embodiment, therefore, increases the time-average expander bus bandwidth utilization and reduces the new stream context's latency to first data.

Additionally, since an embodiment of the invention directly encodes PCI stream information in the header identification field, straightforward expander bus debugging of the read streaming logic and a hook for traffic characterization analysis may easily be asserted.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising;
   a bridge circuit for coupling a first bus to a second bus;
   the bridge circuit having a first bus interface coupled to the first bus and adapted to receive a plurality of transactions from the first bus, each transaction having an address targeting the second bus and data, the length of the data defining a transaction size;
   a request data engine for issuing requests on a second bus, the request data engine capable of assigning a unique encoded header to data streams;
   control logic adapted to store a first portion of a transaction of the plurality of transactions in a memory coupled between the first bus and the second bus; and
   management logic adapted to manage multiple out-of-order data streams wherein the data streams may remain outstanding to the bridge circuit.

2. The apparatus of claim 1, wherein the unique encoded header comprises a plurality of unique sub-fields.

3. The apparatus of claim 2, wherein the plurality of unique sub-fields includes a mask field, a stream number field, a new stream flag, and a packet order flag.

4. The apparatus of claim 1, wherein the memory is a cache.

5. The apparatus of claim 1, wherein the memory is a two ported RAM.

6. The apparatus of claim 5, wherein the memory further comprises
   a read pointer and a write pointer coupled to the memory;
   a validity bit field; and
   a plurality of fields for storing information from a plurality of data packets.

7. The apparatus of claim 6, wherein the read pointer and the write pointer are set to an equal index.

8. The apparatus of claim 1, wherein the unique encoded header includes a virtual look-up-table of stream packet context.

9. The apparatus of claim 1, wherein the first bus is an expander bus.

10. The apparatus of claim 1, wherein the second bus is a PCI bus.

11. A computer system comprising:
    a chipset coupled to a first bus;
    a bridge circuit for coupling the first bus to a second bus;
    the bridge circuit having a first bus interface coupled to the first bus and adapted to receive a plurality of transactions from the first bus, each transaction having an address targeting the second bus and data, the length of the data defining a transaction size;
    a request data engine for issuing requests on a second bus, the request data engine capable of assigning a unique encoded header to data streams;
    control logic adapted to store a first portion of a transaction of the plurality of transactions in a memory coupled between the first bus and the second bus; and
    management logic adapted to manage multiple out-of-order data streams wherein the data streams may remain outstanding to the bridge circuit.

12. The computer system of claim 11, wherein the chipset further comprises:
    a switch for a memory, a plurality of I/O, and a processor;
    a plurality of routes to parallel-segment buses;
    a plurality of intermediate caches; and
    a memory module.

13. The computer system of claim 11, wherein the unique encoded header comprises a plurality of unique sub-fields.

14. The computer system of claim 13, wherein the plurality of unique sub-fields includes a mask field, a stream number field, a new stream flag, and a packet order flag.

15. The computer system of claim 11, wherein the memory is a cache.

16. The computer system of claim 11, wherein the memory is a two ported RAM.

17. The computer system of claim 16, wherein the memory further comprises
    a read pointer and a write pointer coupled to the memory;
    a validity bit field; and
    a plurality of partitions for storing information from a plurality of data packets.

18. The computer system of claim 17, wherein the read pointer and the write pointer are set to an equal index.

19. The computer system of claim 11, wherein the unique encoded header includes a virtual look-up-table of stream packet context.

20. A method comprising:
capturing a data stream request header;
determining which data stream a request is mapped into;
assigning a unique encoded header to a data packet;
issuing request packets with the unique encoded header;
receiving completion request data packets;
setting a first pointer in a memory;
incrementing a portion of a memory address; and
checking if all data packets are stored in the memory.

21. The method of claim 20, wherein assigning, the unique encoded header comprises
loading a plurality of unique sub-fields within the encoded header.

22. The method of claim 21, wherein the plurality of unique sub-fields includes a mask field, a stream number field, a new stream flag, and a packet order field.

23. The method of claim 20, further comprising managing multiple out-of-order data streams wherein the data streams may remain outstanding to a bridge circuit.

24. A computer-readable medium having a sequence of instructions stored thereon, the sequence of instructions, when executed by a processor, causes the processor to perform operations comprising:
capturing a data stream request header;
determining which data stream a request is mapped into;
assigning a unique encoded header to a data packet;
issuing request packets with the unique encoded header;
receiving completion request data packets;
setting a first pointer in a memory;
incrementing a portion of a memory address;
checking if all data packets are stored in the memory; and
managing multiple out-of-order data streams, wherein the data streams may remain outstanding to a bridge circuit.

25. The computer-readable medium of claim 24, wherein assigning the unique encoded header comprises loading a plurality of unique sub-fields within the encoded header.

26. The computer-readable medium of claim 25, wherein the plurality of unique sub-fields includes a mask field, a stream number field, a new stream flag, and a packet order field.

* * * * *